United States Patent Office 2,710,221
Patented June 7, 1955

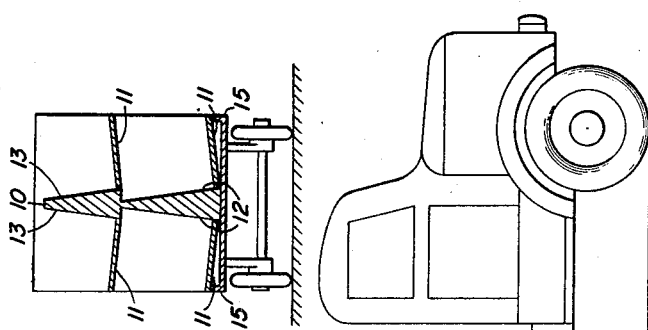
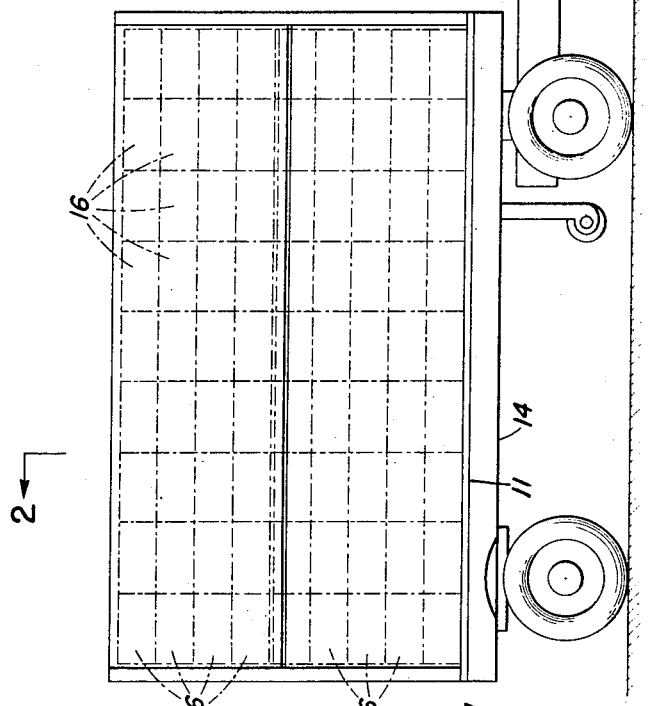
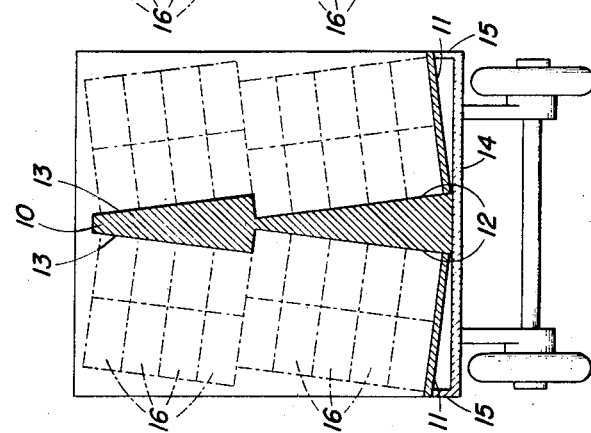

2,710,221
TRUCK BODY FOR CARRYING STACKED CASES
Frederick J. Hinners, Hackensack, N. J.
Application November 13, 1950, Serial No. 195,427
3 Claims. (Cl. 296—3)

This invention relates to a truck body particularly adapted to carry a series of stacked cases or cartons containing for example bottles of soft drinks.

Heretofore truck bodies adapted for such purpose have been provided with a central spacing member and tilted shelves at each side on which a series of cases or cartons may be stacked. The tilted bases are elevated at their outside edges. Cases are stacked side by side and one on top of another and ride firmly thus without tieing, strapping or restraint due to the incline on which they rest. This arrangement is practical since the crates or cases in normal service do not become dislodged during transit; yet, on the other hand, are readily loaded on the truck by mechanical or manual means and are completely and conveniently accessible for unloading.

Many State laws regulate the size of truck bodies often prescribing maximum allowable height and width. Truck bodies for carrying stacked cases, as described above, cannot take full advantage of allowable dimensions, however, due to the generally triangular cross section of the load. Width limitations of the base do not ordinarily permit regular stacking of cases with full contact at the inner side and base to extend to the maximum allowable height.

It is therefore the object of this invention to provide a truck body capable of transporting a greater number of stacked cases than heretofore possible. It is another object of this invention to provide a truck body capable of transporting a greater number of stacked cases securely and safely.

Construction and operation of the truck body of this invention will be apparent from the following, more complete description thereof and from the drawings in which:

Fig. 1 shows a general side view of the truck body and,

Fig. 2 shows a sectional view of the same taken along the line 2—2.

Referring now to the drawings, the truck body of this invention comprises a central upright member, 10, having a base of substantial thickness to which are attached at or near the base outwardly extending shelves, 11. The shelves 11 are of appropriate dimensions depending on the size of the cases to be transported and the permissible overall width of the truck and are set at a slight angle preferably about 9° to the horizontal with their outer edges elevated substantially as shown. The side faces 12 of central member 10 are arranged substantially perpendicular to the shelves 12. At a point below that at which faces 12 would intersect if continued upward, the central member 10 is widened to a thickness preferably about the same as the base thereof and continuing upward, with side faces 13 substantially parallel to faces 12. The base of the truck body may be supported by horizontal platform or member 14 with the outer edges of the shelves 11 maintained by sills 15. If desired, additional shelves of similar dimensions corresponding to shelves 11 may be placed at the base of the upper triangle of the central member. These shelves should be parallel to shelves 11 with their outer edges vertically aligned with the edges of the lower shelves. These upper shelves will be found to provide somewhat better support for the upper tiers in some cases.

In operation of the device, cases of soft drinks for instance 16 are stacked or tiered on shelves 11 to the capacity of the body. Since the cases 16 are provided with adequate support by the shelf or the case below and full contact with a face of the central member, they ride firmly and securely without shifting and do not require strapping, tieing or other mechanical means to hold them in place.

It will be apparent that the central member of the truck body of this invention possesses a cross section in the form of superimposed, truncated triangles. While the embodiment shown in the drawings shows two triangular sections superimposed, more than this number may be employed and the tiers extended upwardly to any desired height.

While this invention has been described and illustrated by the embodiment shown, it is not intended to be strictly limited thereto and other modifications and variations may be employed within the scope of the following claims.

I claim:
1. A truck body for transporting tiered cases or the like comprising a central vertical member of cross section in the form of a plurality of truncated triangles having substantially identically dimensioned bases, the corresponding side members of each triangle being parallel and outwardly projecting shelves at the base of said member elevated at their outer edges to form an angle of about 9 degrees with the horizontal and arranged substantially perpendicular to the side members of said triangle.

2. A truck body for transporting tiered cases or the like comprising a central vertical member of cross section in the form of a plurality of truncated triangles having substantially identically dimensioned bases, the corresponding side members of each triangle being parallel, and outwardly projecting shelves at the base of each of said triangles elevated at their outer edges to form an angle of about 9 degrees with the horizontal and arranged substantially perpendicular to the side member of said triangle.

3. A truck body for transporting tiered cases or the like comprising a central vertical member of cross section in the form of a plurality of truncated triangles having substantially identically dimensioned bases, the corresponding side members of each triangle being parallel, and outwardly projecting shelves at the base of each of said triangles elevated at their outer edges to form an angle of about 9 degrees with the horizontal and arranged substantially perpendicular to the side member of said triangle, the outer edges of said shelves being substantially vertically aligned.

References Cited in the file of this patent

UNITED STATES PATENTS

| Number | Name | Date |
| --- | --- | --- |
| D. 122,011 | Erickson | Aug. 20, 1940 |
| 1,293,752 | Gibson | Feb. 11, 1919 |
| 1,879,513 | Rothholz | Sept. 27, 1932 |
| 2,061,673 | Robinson | Nov. 24, 1936 |
| 2,468,513 | Rider | Apr. 26, 1949 |
| 2,596,478 | Gerhardt | May 13, 1952 |
| 2,650,856 | Washburn, Jr., et al. | Sept. 1, 1953 |

FOREIGN PATENTS

| 23,180 | Great Britain | Aug. 20, 1903 |